Figure 4:
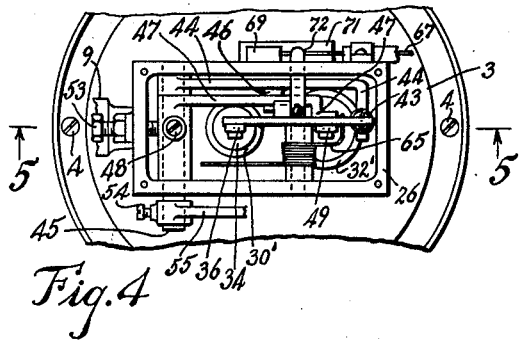

June 30, 1953   W. H. RIGHTER   2,643,746
VACUUM OPERATED BRAKE ACTUATOR
Filed Dec. 31, 1948   3 Sheets-Sheet 1
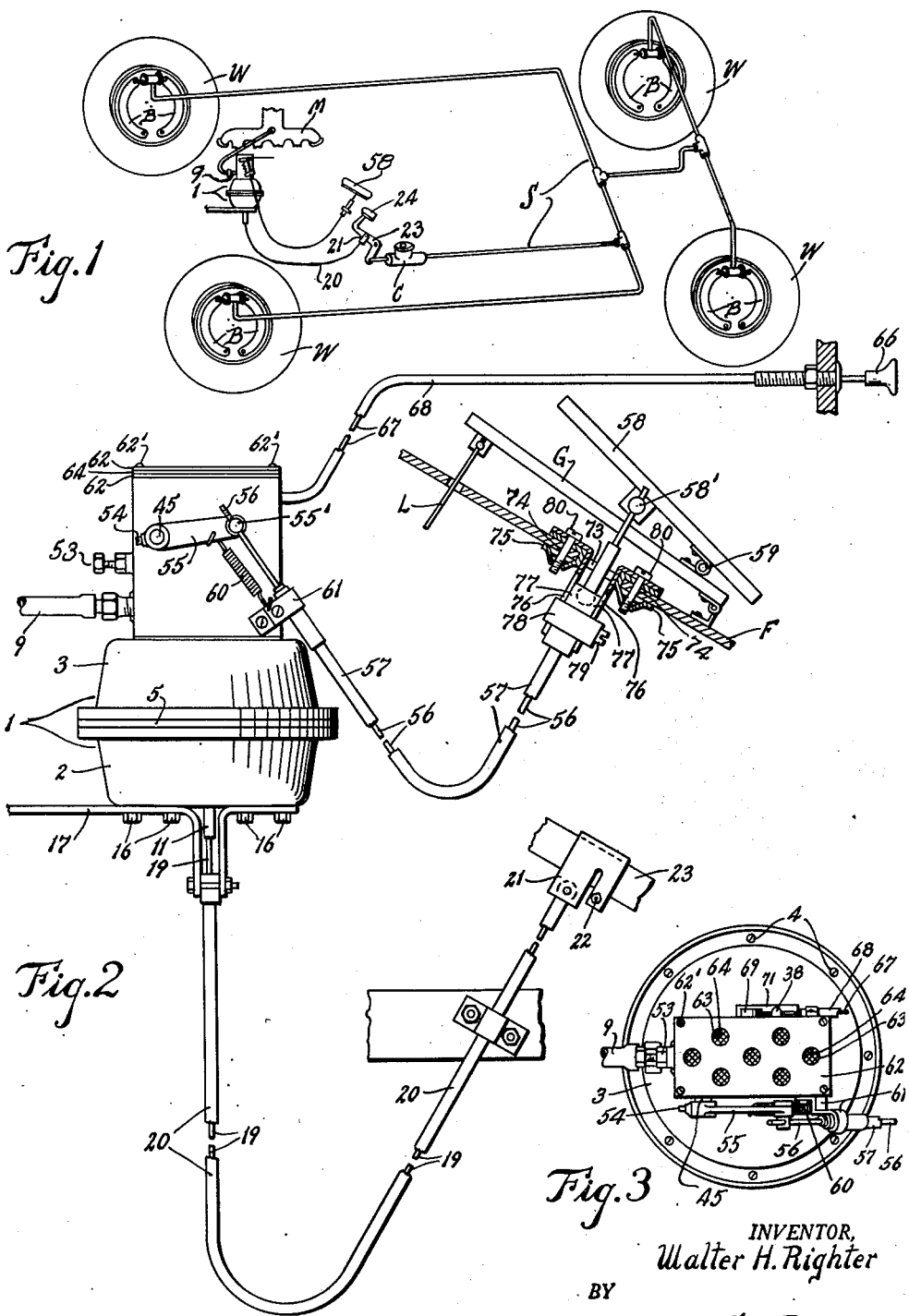
INVENTOR,
Walter H. Righter
BY
Harold J. LeVesconte
ATTORNEY.

June 30, 1953  W. H. RIGHTER  2,643,746
VACUUM OPERATED BRAKE ACTUATOR
Filed Dec. 31, 1948  3 Sheets-Sheet 2

INVENTOR,
Walter H. Righter
BY
Harold J. LeVesconte
ATTORNEY.

June 30, 1953   W. H. RIGHTER   2,643,746
VACUUM OPERATED BRAKE ACTUATOR
Filed Dec. 31, 1948   3 Sheets-Sheet 3
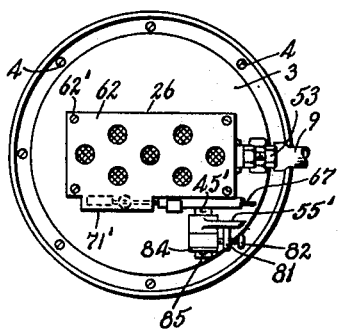
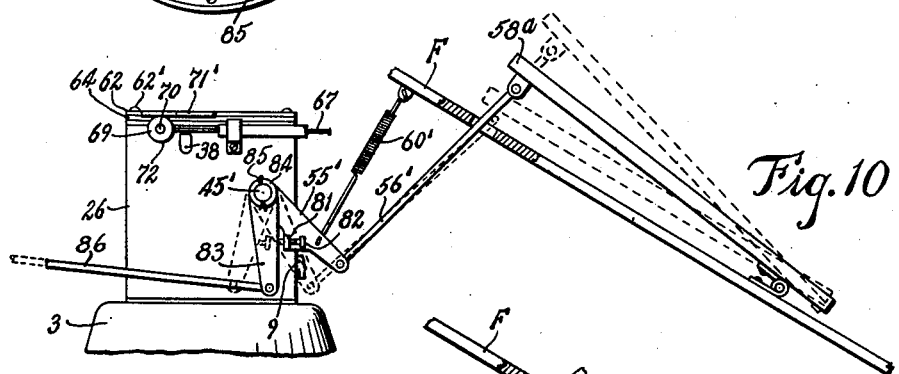
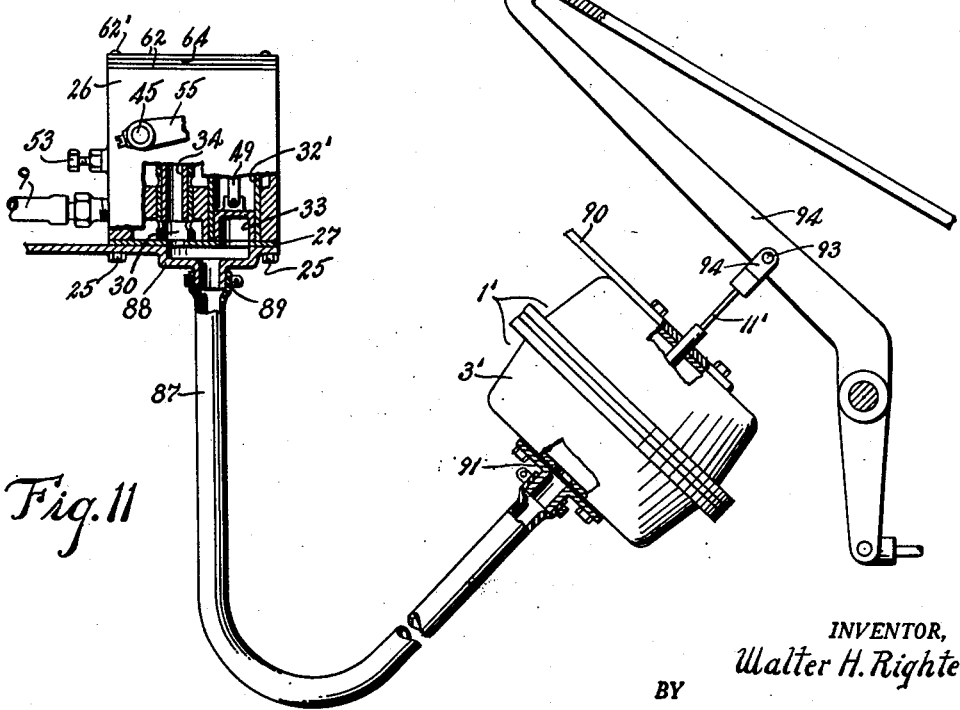
INVENTOR,
Walter H. Righter
BY
Harold J. LeVesconte
ATTORNEY.

Patented June 30, 1953

2,643,746

UNITED STATES PATENT OFFICE 2,643,746

VACUUM OPERATED BRAKE ACTUATOR

Walter H. Righter, Glendale, Calif.

Application December 31, 1948, Serial No. 68,713

23 Claims. (Cl. 192—3)

This invention relates to control apparatus for braking motor vehicles and particularly to an improved form thereof in which the reaction time between the sensing of necessity for a reduction of speed or for a stop is reduced and which, further, is effective to hold the brakes applied while the motor of the vehicle is idling and the driver's foot is off the throttle or "gas pedal."

Under modern driving conditions with the attendant high speeds and the frequent necessity for sudden reductions in speed or for sudden stops, even fractions of seconds saved may mean the difference between safety and a collision and its attendant damage and possibility of personal injury. Regardless of the efficiency of the braking system of a vehicle, the most important consideration is the reaction time between the sensing of the necessity for braking action and the beginning of the application of the brakes. Since the speed of the vehicle is not reduced during this time, any reduction of this time will serve to reduce the distance in which the vehicle may be brought to a stop more than the same reduction of time during the actual braking operation.

It has been established by experiments that the average driver has a reaction time of 0.75 second and in the case of some drivers, the reaction time factor may be much longer. Upon sensing the need for quickly stopping or slowing down the vehicle, the first reaction of the driver is to let up on the foot operated throttle and he then must use the same foot to apply the brakes. The present invention aims to employ the first of these two steps only, in stopping the vehicle so that the release of the throttle is the movement that causes the brakes to be applied with the resultant saving of the time that would be employed in applying the foot operated brakes in the conventional manner. This saving of time will serve to reduce the travel of the vehicle in coming to a stop and will either avoid a collision that would otherwise have occurred, or at least, it will have so reduced the speed so that the impact will be reduced with resultant diminution of the extent of damage or injury that might have otherwise occurred.

Another common type of motor vehicle accident is that caused by leaving the vehicle parked on an incline without setting the hand brakes sufficiently. This most generally arises in the case of delivery vehicles from which many momentary stops are made. Some effort has heretofore been made to provide some sort of automatic braking means that will hold the vehicle at the point at which it is stopped, but so far as is known, none of these efforts has been successful commercially.

With the above problems in mind, it is the principal object of the invention to provide a vacuum operated brake applying means for motor vehicles which is so constructed and arranged that it will maintain the brakes applied at all times while the motor is idling with the throttle or "gas" pedal not depressed by the foot of the operator.

Another object of the invention is to provide a brake operating apparatus of the above character which is operated by the foot of the operator normally employed to operate the throttle without the necessity of removing that foot to the brake pedal to effect an application of the brakes.

Still another object of the invention is to provide a motor vehicle braking apparatus of the above character which includes means whereby it may be rendered inoperative at the will of the operator without affecting the normal operation of the foot operation of the brakes.

A still further object of the invention is to provide a vacuum operated motor vehicle brake applying apparatus which is so constructed as to be readily installed on existing vehicles.

Still another object of the invention is to provide a vacuum actuated brake operating apparatus which is so constructed and arranged that a braking operation will produce a reaction against the operating pedal which is indicative of the magnitude of the braking effort, so that the driver may be enabled thereby to vary the extent of the braking effort to suit varying driving conditions.

Another object of the invention is to provide a vacuum operated brake operating apparatus for motor vehicles comprising a single vacuum cylinder and a single valve associated therewith which may be manipulated by the driver to effect varying magnitudes of braking effort.

Still another object of the invention is to provide a vacuum operated brake applying apparatus which includes means whereby the maximum braking effort may be determined to suit the needs of different vehicles or the desires of individual users.

A still further object of the invention is to provide a vacuum operated brake actuating apparatus for motor vehicles which achieves the above desirable objectives and which is simple in construction, economical to manufacture, and reliable in operation.

Figure 5:
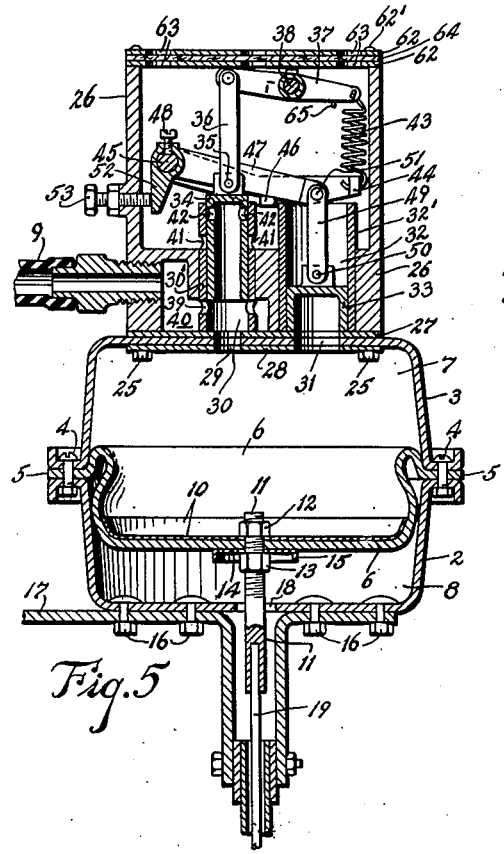
Figure 8:
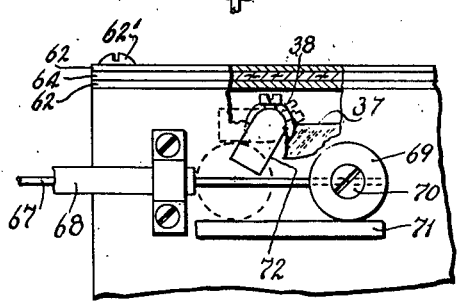
Figure 6:
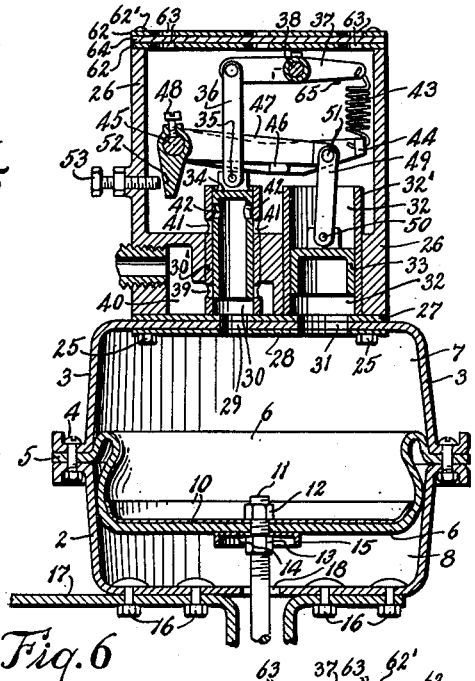
Figure 7:
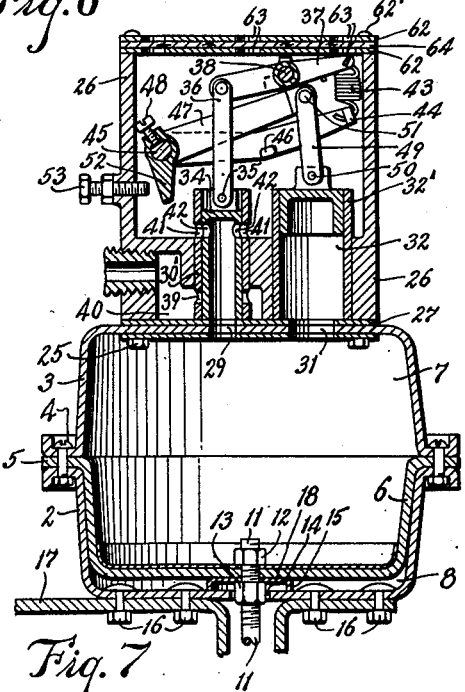

With the above objects in view, together with such other objects and advantages as may subsequently appear, the invention resides in the parts, and in the construction, combination and arrangement of parts described, by way of example, in the following specification, reference being had to the accompanying drawings forming a part thereof and in which drawings:

Fig. 1 is a schematic view of a representative braking system for a motor vehicle having the present invention applied thereto, Fig. 2 is a side elevation in the invention applied to a vehicle with portions of the control and operating members broken away to permit the parts to be shown in closer proximity to each other than the positions actually occupied in the vehicle, Fig. 3 is a top plan view of the vacuum cylinder unit of the apparatus, Fig. 4 is an enlarged top plan view similar to Fig. 3, but with the cover plate and filter removed to show the valve operating means associated with the vacuum cylinder, Fig. 5 is a vertical sectional view taken on the line 5—5 of Fig. 4 and showing the relative positions of the valve and other control means when a sudden and full application of braking effort is first applied, Fig. 6 is a view similar to Fig. 5, but showing the positions assumed by the parts during the continued application of the brakes, Fig. 7 is another view similar to Fig. 5 showing the positions of the parts when the brake operating means is inoperative, Fig. 8 is a fragmentary, enlarged side elevation of the side of the vacuum cylinder unit opposite that shown in Fig. 2 to show details of the manually controlled disabling means, Fig. 9 is a top plan view of a modified form of control unit, Fig. 10 is a side elevation, partly in section, of the form of control unit shown in Fig. 9 and additionally showing the connection to and mode of operation the unit by a single foot pedal in contrast to the combined pedals associated with the form of the invention shown in Figs. 1 to 8, and Fig. 11 is a side elevation, partly in section showing a second modified form of the invention in which the vacuum cylinder is mounted separately from the control unit.

In the illustrated embodiment, the invention comprises a conventional vacuum cylinder 1 formed from a pair of oppositely disposed bowl-like members 2 and 3 secured together by a series of bolts 4 passing through the rims of the members with the interposed flange 5 of a flexible rubber diaphragm 6 serving as a gasket therebetween. The diaphragm extends across the cylinder and is cupped to fit into the member 2 thereof and it divides the interior of the cylinder into a vacuum chamber 7 and a chamber 8 which is subject to atmospheric pressure at all times. The vacuum chamber 7 is connected by a hose or other conduit 9 with a source of suction such as the manifold M of the vehicle motor with interposed valve means which will hereinafter be described in detail.

Positioned on the vacuum chamber side of the diaphragm is a shallow, cup-shaped piston head 10 attached to the diaphragm and a piston rod 11 by means of nuts 12 and 13 which are threaded on the end of the piston rod (see Fig. 5). A washer 14 having a depending skirt portion 15 is placed between the nut 13 and the diaphragm; the flat portion of the washer serving to protect the surface of the diaphragm from abrasion by the nut and the skirt portion 15 thereof serving to limit outward movement of the piston and thus to prevent the diaphragm from contacting the screws 16 by which the vacuum cylinder assembly is mounted on a suitable supporting bracket means 17 (see Fig. 5). The piston rod extends through an opening 18 in the head of the cylinder member 2 which opening serves also to permit the flow of air into and out of the chamber 8 incident to the movement of the piston and diaphragm and the end of the piston rod is attached to one end of a push-pull cable 19 contained in a flexible guiding sheath 20.

The other end of the cable 19 is attached to a clamp 21 which is secured by a bolt 22 to the shank 23 of the brake pedal 24 of the vehicle at a point adjacent the pivotal support of the pedal. It will be noted from Figs. 2 and 5 that when a vacuum is produced in the chamber 7, the atmospheric pressure in chamber 8 will tend to move the diaphragm and piston into the chamber 7 and that this movement through the cable 19 will effect movement of the brake pedal in the same manner as though operated by the foot of the driver with resultant creation of braking effort through the braking system of the vehicle including the master cylinder C and the fluid conduit lines or system S extending to the brakes B in the vehicle wheels W (see Fig. 1).

Secured to the outer end face of the cylinder member 3 by means of screws 25 is a hollow, rectangular housing 26. A gasket 27 is interposed between the adjacent faces of the housing and cylinder and a washer element 28 is interposed between the heads of the screws 25 and the inner face of the member 3. The gasket 27, washer element 28 and the end of the cylinder element are provided with registering holes which form a passage 29 between the vacuum chamber 7 and a valve chamber 30 formed by a sleeve 30' mounted in the housing 26. A second series of registering holes in said gasket, washer element and cylinder end form a second passage 31 between the vacuum chamber 7 and a cylinder 32 formed by a sleeve 32' mounted in the housing 26 and in which a piston element 33 is mounted for reciprocation.

Slidably mounted in the sleeve 30' is a cylindrical valve element 34 having the end thereof remote from the passage 29 closed and the valve element is connected at said closed end by a pivot pin 35 to one end of a link 36; the other end of said link being pivotally connected to one end of a lever 37 fixed intermediate its ends to a rock shaft 38 journalled in the sidewalls of the housing 26 near the end thereof remote from the cylinder member 3 and which shaft serves as a fulcrum for said lever; the lever thus being a lever of the first order in that the fulcrum point is disposed between the points of application of load and force thereon. At the end thereof adjacent the cylinder member 3 the sleeve 30' is provided with a series of exhaust ports 39 which afford communication between the valve chamber 30 and the chamber 40 formed in the housing 26 and with which the vacuum line 9 communicates. Adjacent its other end the sleeve 30' is also provided with a series of ports 41 which afford communication between the chamber 30 and the interior of the housing 26 when the ports 42 at the adjacent end of the valve element 34, are in line therewith incident to certain phases of operation of the apparatus as will be later explained.

The other end of the lever 37 is connected by a tension spring 43 to the free end of a lever 44 which lever at its other end is freely mounted on a rock shaft 45 journalled in the sidewalls of the housing 26 adjacent to the sleeve 30'. At about midway of its length, the lever 44 is provided with a laterally extending lug 46 which lies in the path of movement of a lever arm 47 mounted on and fixed to the rock shaft 45 by a set screw 48. The lever arm 47 extends generally parallel to the lever 44 and at its free end it is connected by a link 49 and pivot pins 50 and 51 to the end of the piston 33. Adjacent the shaft 45 the lever arm 47 carries a lug 52 extending parallel to the end wall of the housing and adapted to engage an adjustable stop screw 53 extending through said end wall to limit the extent to which the lever arm and shaft 45 can be moved. Since the lug 46 constitutes the point of application of force to the lever and is located between the fulcrum point and the point of application of load to the lever, the lever 44 is a lever of the third order.

The rock shaft 45 extends beyond one of the sidewalls of the housing 26 and secured to the projecting end of the shaft by a screw 54 is a lever arm 55 which extends generally parallel to the lever arm 47 and which at its free end is connected to one end of a non-yielding or, in other words, a constant length linkage means, here shown by way of example as a push-pull cable 56 mounted for reciprocation in a flexible sheath 57. The other end of the cable is connected to a foot pedal 58 hinged at 59 to and overlying the usual throttle or "gas" pedal G of the vehicle and which, in turn, is connected by a linkage L to a valve in the intake manifold M of the motor. A tension spring 60 attached at one end to the free end of the lever arm 55 and at its other end to a stationary point, such as the bracket 61 which connects one end of the sheath 57 to the housing 26, provides a constant bias and tends to move the pedal 58 away from the pedal G and to rock the shaft 45 in a clockwise direction, as viewed in Figs. 2, 5, 6 and 7. The other end of the sheath may be connected to the floor board F of the vehicle in any desired manner; a preferred form of such connection being hereinafter described in detail. The top of the housing 26 is preferably closed by a pair of plates 62, 62, secured thereon by screws 62'; said plates having a series of aligned openings 63 therein and having a filter element 64 of felt or the like interposed between them to exclude any dust or grit from air drawn through the housing incident to operation of the apparatus.

When the vehicle is in motion, the pedal 58 is depressed against the pedal G to depress that pedal and to open the throttle valve in the usual manner. This movement of the pedal 58 will be in opposition to the force exerted by the spring 60 and will rock the shaft 45 in a counterclockwise direction lifting the free end of the lever arm 47 (as viewed in Figs. 5, 6 and 7), allowing the lever 44 to move with it to release the tension on the spring 43 and thus allowing the torsion spring 65, which is mounted on the lever 37 and reacts against the inner face of the cover plate 62, to rock the shaft 38 and lever 37 in a counterclockwise direction and thereby to move the valve element 34 downwardly (as shown in Fig. 7) cutting off the suction of the vacuum line 9 and admitting air into the vacuum chamber 7 through the ports 41 and 42 which are then in alignment. Since the pressure on both sides of the diaphragm is then equalized, the springs associated with the brakes of the vehicle will be free to act and will hold the brakes retracted and the brake pedal fully extended through the floor board of the vehicle.

It will be noted in Fig. 2 that the ends of the control cable threadedly engage pivot pins 55' and 58' in the lever arm 55 and the pedal 58, respectively. This permits the effective length of the cable to be so adjusted that when the pedal 58 is pressed against the pedal G and both pedals are moving as a unit, the lever arms 55 and 47 and the rock shaft 45 will be moving only in that portion of their movement during which there is no contact with the lever 44 through the lug 46, thus permitting the spring 65 to hold the valve 34 in the position shown in Fig. 7, and so that when the pedal 58 moves away from the pedal G, the arm 47 will be brought into contact with the lug 46 and cause it to effect the opening of the ports 39 and thus to initiate the application of the brakes. Preferably, the length of the cable is such that the contact with the lug 46 by the lever 47 occurs after a slight amount of movement of the pedal 58 away from the pedal G to provide a slight portion of the travel of the pedal 58 in which the throttle is closed but in which the brakes are not applied.

When a stop or slowing up of the vehicle is to be made, the driver lets up on the pedal 58 and the pedal G will follow it to the point permitted by the linkage L. As the driver then continues to let up on the pedal 58, it will be moved away from the pedal G by the spring 60 with incident clockwise movement of the shaft 45 and of the lever arm 47 fixed thereto within the housing 26. This movement will cause the lever arm 47 to engage the lug 46 on the lever 44 and move this lever also which, in turn, will stretch the spring 43 to overcome the bias of the torsion spring 65 and will cause the lever 37 and shaft 38 to be rocked in a clockwise direction, lifting the valve element 34 with incident closing of the ports 41 and opening of the ports 39 thus permitting the vacuum line to exhaust the air in the chamber 7 whereupon, atmospheric pressure entering the opening 18 in the cylinder member 2 will move the piston 10 and diaphragm into the chamber 7 and, through the connection of the piston to the cable element 19, this movement will apply the brakes. At the same time, atmospheric pressure will be operating on the closed end of the piston 33 tending to move it toward the chamber 7 and since the piston is connected to the lever arm 47 this tendency will tend also to move the lever 44 to increase the tension on the spring 43 and to increase the tendency to hold the valve element open to the vacuum line. Also at the same time, atmospheric pressure is operating on the closed end of the valve element 34 tending to move it to cut off the vacuum line against the tension of the spring 43, resulting in a balanced condition in which the valve element hovers between admitting air or permitting suction as illustrated in Fig. 6.

The load on the piston 33 is transmitted to the pedal 58 through the cable 56 and it will be obvious that the further the pedal 58 is permitted to be moved by the spring 60, the greater will be the tension applied to the spring 43 and the greater the vacuum that will be required to bring the valve element 34 to its balanced position and, consequently, the resulting braking force will be increased. Since the vacuum is greater, the reaction against the pedal 58 by the piston 33 will also be increased and thus the driver is given a positive reaction, developed directly from the creation of the vacuum and by which he may judge the braking effort and can regulate it to suit the condition with which he is confronted. This reaction against the driver's foot, while not a product of the actual train of brake applying mechanism, is, nevertheless, a product of the brake actuating power source and serves the same purpose as would a load-feel connection directly connected between the vacuum cylinder piston and the master cylinder C.

Fig. 5 depicts the relative positions of the parts when the pedal 58 is completely released as in the case of an emergency stop or in the case of the driver leaving the vehicle parked with the motor running as for instance in making a delivery. This action is also valuable in driving in crowded traffic conditions, especially on inclines where frequent stops and starts are required to be made.

The purpose of the adjusting screw 53 is to enable individual adjustment to be made in the extent of maximum braking effort to suit different weights of vehicles and varying efficiencies of different braking systems as well as the preferences of individual drivers. It will be obvious that the further the screw 53 is moved into the housing, the less the movement that will be allower the lever arm 47. This, in turn, will limit the movement that will be given the lever 44 and the maximum tension that can be applied to the spring 43 with consequent reduction of the amount of vacuum that will be required to bring the valve element to the balanced position during a braking operation and reduction of the maximum braking effort. As the screw 53 is moved outwardly, the reverse of the above described actions will occur with consequent increase in the maximum braking effort.

It will be noted that in the illustrated embodiments of the invention, the piston 33 is of greater diameter than the valve element 34 and that for any given degree of vacuum in the vacuum cylinder, the force exerted by the piston 33 will be proportionately greater than the force tending to move the valve 34 to cut off the vacuum producing suction. It will be realized that for certain installations, these diameters may be equal or that the piston diameter may be smaller than the valve diameter so long as by the inter-connection between them the piston is enabled to achieve the balancing effect and, preferably, also, to give an indication of the magnitude of the braking effort to the driver through the reaction transmitted to the brake pedal.

Means has also been provided whereby the use of the apparatus is optional. This comprises a push-pull button 66 on the dash or instrument panel of the vehicle which button is connected by a wire 67 guided in a flexible sheath 68 to a cam member 69 secured to the wire by a screw 70 and adapted to slide on a ledge 71 projecting outwardly from the side wall of the housing 26 below the level of the shaft 38. The end of the shaft 38 projects through the sidewall of the housing and is bent at right angles to the main portion of the shaft to provide a cam face 72 engageable by the cam member 69. Thus when the button 66 is pulled out, the cam member 69 will move between the ledge and the cam face 72 and will cause the shaft 38 to be rocked in a clockwise direction as viewed in Fig. 8 and will lock it in that position. The parts will then be in the position shown in Fig. 7 with the vacuum chamber open to atmosphere. When thus locked, any movement of the pedal 58 toward and away from the pedal G will be expended in expansion and contraction of the spring 43 and the vehicle can be controlled by the normal use of the brake pedal. When vacuum operation of the brakes is again desired, it is necessary only to push in the button 66 to release the shaft 38 for movement and the apparatus is ready for operation.

Attention is directed to the novel means for connecting the pedal end of the sheath 57 for the cable 56 to the floor board F of the vehicle. In making the installation, a hole 73 is cut in the floor board which hole is considerably larger than the sheath and additionally, two smaller holes 74, 74 are drilled in the floor board at diametrically opposite points near the edge of the hole 73. Snapped into these holes and extending over the edge of the hole 73 are sheet metal nuts 75, 75 disposed with their thread engaging portions below the floor board. The end of the sheath 57 is then pulled through the hole 73 and a pair of L-shaped brackets 76, 76 formed from malleable metal are clamped to opposite sides of the collar 77, carried by the end of the sheath 57 by means of a clamp collar 78 of rectangular form and a set screw 79 threaded into the clamp collar. The assembly of brackets and sheath is then lowered into place in the hole 73 and screws 80, 80 passing through holes in the brackets are screwed into the nuts 75, 75 to hold the assembly in place. Thus the cable and sheath may be attached to the floor board by means which is applied wholly from the top of the floor board and without the necessity of getting under the vehicle for any operation incident to such attachment. The malleability of the brackets 76, 76 permits them to be bent to accommodate the line of movement of the cable 56 and the consequent position of the sheath to the angle of the floor board F of the vehicle.

Referring now to Figs. 9 and 10, there is illustrated a modification of the invention which is particularly adapted to be installed in new vehicles in the course of their assembly. The outstanding feature is the simplification thus made possible by combining both the braking and throttle controls in a single pedal instead of the two overlying pedals employed in the first described form of the invention.

In this form of the invention, the housing 26 is positioned so that the edge face adjacent the rock shaft 45' is nearest the foot pedal and floorboard F, or, in other words, it is rotated 180° from the position shown in Figs. 1 to 8. The rock shaft 45' exteriorly of the housing, has fixed thereto a downwardly and rearwardly depending arm 55' which is connected by a rigid link 56' to the free end of a foot pedal 58a the other end of which is hinged to the floor-board F. A tension spring 60' extending between the under face of the floor board and the arm 55' serves to urge the pedal outwardly and to rotate the shaft 45' in a counterclockwise direction as viewed in Fig. 10. At about its midlength, the arm 55' is provided with a laterally and outwardly disposed lug 81 provided with an adjustable abutment screw 82 which screw is adapted to engage the edge of an arm 83 freely mounted on the end of the shaft 45' adjacent the arm 55'. A washer 84 and cotter pin 85 serve to hold the arm 83 on the shaft 45'. The depending free end of the arm is connected by a link 86 to the usual throttle valve (not shown) and the stop means associated with such valve and the spring means for urging the valve to closed position tend to hold the arm in the position shown in full lines in Fig. 10 when the throttle is closed. The mechanism within the housing is the same as that shown in Figs. 5, 6 and 7 except that, as viewed from the same side of the vehicle the parts are reversed from right to left.

Additionally, the disabling means are altered by moving the wire 67 to a position above the shaft 38 and by providing an extension 71' on the uppermost of the plates 62 to serve as a ledge against which the cam member 69 may react in engaging the cam face 72 on the shaft 38 to render the apparatus inoperative.

The pedal 58' is shown in full line position in the short idle space between the driving and braking portions of its path of movement. In the driving range the downward movement of the pedal 58' will swing the lever 55' and rock shaft 45' in a clockwise direction with the screw 82 engaging the arm 83 carrying the arm with it and through the link 86, opening the throttle to the desired extent. During this time, the parts within the housing will be in the position shown in Fig. 7 with the suction cut off and the brakes released.

When the vehicle is to be braked, the driver lets up on the pedal 58' and the throttle closes. Continued upward movement of the pedal moves the arm 55' and rock shaft 45' in a counterclockwise direction moving the screw 82 away from the arm 83 and within the housing moving the arm 47 downwardly and through the arm 44, spring 43 and lever 37 causing the valve 34 to be lifted to open the vacuum chamber to suction with the previously described subsequent balancing action of the valve and the imposing of a load on the arm 47 by the piston 33, in addition to the load imposed by the spring 60' which load will be transmitted to the foot pedal so that the operator may judge the magnitude of the braking effort and regulate it according to the demands of the situation. When the vehicle is left standing with the motor idling, the pedal will be moved by the spring 60' to its extreme upward position holding the brakes as fully applied as the adjustment of the screw 53 will permit. The screw 82 may be adjusted to increase or decrease the extent of idle movement of the pedal between closing of the throttle and engagement of the lever 44, by the lever arm 47 and consequent actuation of the brakes to suit the desire of the user. Other linkages and lever arrangements between the foot pedal, the control unit and the throttle will suggest themselves to persons skilled in the art, and the showing in Figs. 9 and 10 is to illustrate that for certain installations, the same advantages derived in the first described form of the invention can be achieved with a single pedal. The first form is best adapted for existing vehicles while the second form is best adapted for installation in vehicles during their manufacture.

Referring now to Fig. 11 a second modified form of the invention is shown in which the control unit is separate from the vacuum cylinder 1 being connected thereto by a conduit such as the hose 87. The control unit and foot pedal connection associated therewith may be of the form shown in Figs. 1 to 8 and including the foot pedal 58 and housing 26 or it may be of the form shown in Figs. 9 and 10 including the pedal 58' and the housing 26'. The control unit is mounted on an appropriate bracket means in the engine compartment and is connected to the foot pedal in either of the manners shown in the above described manners or the equivalent thereof as shall suit the particular installation. Attached to the bottom of the control unit by the bolts 25 with the interposed gasket 27 is a manifold 88 affording communication between the valve chamber 30 and cylinder 32 and a hose connection nipple 89 to which one end of the hose 87 is attached. The vacuum cylinder 1' is mounted on suitable bracket means 90 in close proximity to the brake pedal and the member 3' thereof is provided with a nipple 91 to which the other end of the hose 87 is attached. The piston rod 11' is provided with a yoke or clevis 92 connected by a pivot pin 93 to the shank 94 of the brake pedal. The operation of this second modified form of the invention is the same as that described in connection with the two preceding forms; the only difference being the separate mounting of the vacuum cylinder and the control unit. This form of the invention may be used with either of the control units and may either be applied to vehicles in process of manufacture or to existing vehicles. The parts employed, to a great extent, are the same as in the other forms and this form of the invention permits installations to be made in cases where the combined control and cylinder unit occupied more space for installation than was available.

The apparatus is readily installed on any vehicle and does not require the replacement of any of the usual parts of the vehicle. The construction is simple and to a great extent comprises standard parts that are available on the open market, a few of which then require slight modification.

In use, the operation of the apparatus is quick and reliable. For ordinary stops it will operate as readily as the usual foot-operated brakes while for emergency stops it will reduce the time for operation materially with consequent reduction of the distance required to bring the vehicle to a stop or to a reduced speed. This is due to the fact that when faced with a sudden emergency, the driver has merely to let up on the pedal and does not have to transfer his foot to the brake pedal and then apply the brakes. Consequently, a very considerable part of the reaction time is saved and is employed in applying the brakes and thus, the distance required to bring the vehicle to a stop will be materially reduced.

While in the foregoing specification, I have disclosed certain specific modes of execution of my invention, I do not intend thereby to limit myself to the exact forms there disclosed, and the invention includes all such modifications of the parts and of the construction, combination and arrangement thereof as shall come within the purview of the appended claims.

I claim:

1. A vacuum operated vehicle brake actuating apparatus comprising a vacuum cylinder having a reciprocable piston adapted to be connected to the brake pedal of the vehicle and having a vacuum chamber adapted to be connected with and disconnected from a suction producing element, a vacuum responsive valve yieldingly connected to a foot pedal controlled by the operator and operable thereby to effect said connection and disconnection, and other devices separately responsive to vacuum in said chamber yieldingly connected to said valve element and also non-yieldingly connected to said foot pedal effective through said non-yielding connection to transmit a vacuum initiated, load-feel type of reaction on said foot pedal proportional to the braking effort exerted by said apparatus during a braking operation.

2. A vacuum operated vehicle brake actuating apparatus comprising a vacuum cylinder having a reciprocable piston adapted to be connected to an actuating element of the vehicle braking system and having a vacuum chamber adapted to be connected with and disconnected from a suction means, vacuum responsive valve means interposed between the suction producing means and said vacuum cylinder including a valve element directly responsive to vacuum in said cylinder, means yieldingly connecting said valve element to a foot pedal and operable thereby to move said valve to effect said connection and disconnection, and other devices separately and directly responsive to vacuum in said chamber interposed between said valve element and said pedal and connected for movement in unison with said pedal effective to oppose the vacuum response of said valve means and to transmit to said pedal a vacuum initiated load-feel type of reaction proportional to the braking effort exerted by said apparatus during a braking operation.

3. A vacuum operated vehicle brake actuating apparatus comprising a vacuum cylinder having a reciprocable piston adapted to be connected to an actuating element of the vehicle braking system for movement therewith and having a vacuum chamber adapted to be connected with and disconnected from a suction producing means, valve means connected to a foot pedal controlled by the operator and operable thereby to effect said connection and disconnection, devices responsive to vacuum in said chamber connected to said valve means constructed and arranged to transmit a vacuum initiated load-feel type of reaction on said pedal proportional to the braking effort exerted by said apparatus during a braking operation and other devices including a manually operable element disposed in the driver's compartment of the vehicle operable to lock said valve means in a position effecting disconnection of the suction producing means from said cylinder while maintaining the capacity of the vehicle braking system for normal manual operation.

4. A vacuum operated vehicle brake actuating apparatus comprising a vacuum cylinder having a reciprocable piston adapted to be connected to the brake pedal of the vehicle and having a vacuum chamber adapted to be connected with and disconnected from a suction producing means, devices for controlling the operation of said cylinder and piston comprising a housing structure mounted on said cylinder a valve chamber in said housing having communication with said vacuum chamber, an exhaust chamber in said housing having a port adapted to be connected to a source of suction, a valve movably mounted in said valve chamber, a port between said valve chamber and said exhaust chamber, a second port between said valve chamber and the atmosphere, and devices including a foot pedal in the driver's compartment of the vehicle and means operated thereby constructed and arranged to move said valve to open said first port and close said second port or to open said second port and close said first port.

5. A vacuum operated vehicle brake actuating apparatus comprising a vacuum cylinder having a reciprocable piston adapted to be connected to an actuating element of the vehicle braking system and having a vacuum chamber adapted to be connected with and disconnected from a suction producing means, devices for controlling the operation of said cylinder and piston comprising a housing structure mounted on said cylinder, a valve chamber in said housing having communication with said vacuum chamber, an exhaust chamber in said housing having a port adapted to be connected to a source of suction, a valve movably mounted in said valve chamber, a port between said valve chamber and said exhaust chamber, a second port between said valve chamber and the atmosphere, and devices including a foot pedal in the driver's compartment of the vehicle and means operated thereby constructed and arranged to move said valve to open said first port and close said second port or to open said second port and close said first port; said devices including a tension spring between two members thereof to permit said valve to move yieldingly with respect to said pedal.

6. A vacuum operated vehicle brake actuating apparatus comprising a vacuum cylinder having a reciprocable piston adapted to be connected to an actuating element of the vehicle braking system and having a vacuum chamber adapted to be connected with and disconnected from a suction producing means, valve means connected to a foot pedal controlled by the operator for optionally effecting said connection and disconnection and devices responsive to vacuum in said chamber yieldingly connected to said valve means constructed and arranged to produce a load-feel type of reaction on said pedal proportional to the braking effort exerted by said apparatus during a braking operation; said devices including a second cylinder having one end thereof open to said vacuum chamber, a piston mounted for reciprocation in said second cylinder and a linkage connecting said piston and said foot pedal for movement in unison with each other.

7. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, vacuum responsive valve means yieldingly connected to a foot pedal controlled by the operator for optionally effecting said connection and disconnection and devices responsive to vacuum in said chamber connected to said valve means constructed and arranged to produce a load-feel type of reaction on said pedal proportional to the braking effort exerted by said apparatus during a braking operation; said devices including a second cylinder having one end thereof open to said vacuum chamber, a piston mounted for reciprocation in said second cylinder and a linkage connecting said piston and said foot pedal for movement in unison with each other; said piston in said second cylinder operating in the presence of a vacuum in said chamber to tend to force said pedal toward the operator's foot.

8. A vacuum operated vehicle brake actuating apparatus comprising a vacuum cylinder having a reciprocable piston adapted to be operatively connected to the brake system of the vehicle and having a vacuum chamber adapted to be connected with and disconected from a suction producing means, devices for controlling the operation of said cylinder and piston comprising a housing structure mounted on said cylinder, a valve chamber in said housing having communication with said vacuum chamber, an exhaust chamber in said housing having a port adapted to be connected to a source of suction, a valve movably mounted in said valve chamber, a port between said valve chamber and said exhaust chamber, a second port between said valve chamber and the atmosphere, devices including a foot pedal in the driver's compartment of the vehicle and means operated thereby constructed and arranged to move said valve to open said first port and close said second port or to open said second port and close said first port, a cylinder formed in said housing having an open end communicating with said vacuum chamber, a piston mounted for reciprocation in said cylinder and means connecting said piston with said devices for movement in said cylinder in unison with the movement of said foot pedal.

9. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, devices for controlling the operation of said cylinder and piston comprising a housing structure mounted on said cylinder, a valve chamber in said housing having communication with said vacuum chamber, an exhaust chamber in said housing having a port adapted to be connected to a source of suction, a valve movably mounted in said valve chamber, a port between said valve chamber and said exhaust chamber, a second port between said valve chamber and the atmosphere, devices including a foot pedal in the driver's compartment of the vehicle and means operated thereby constructed and arranged to move said valve to open said first port and close said second port or to open said second port and close said first port, a cylinder formed in said housing having an open end communicating with said vacuum chamber, a piston mounted for reciprocation in said cylinder, means connecting said piston with said devices for movement in said cylinder in unison with the movement of said foot pedal and a yielding connection between said valve and said last named piston operable in response to the presence of vacuum in said vacuum chamber to permit a limited movement of said valve relative to said devices.

10. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, a housing having a valve chamber communicating with the vacuum chamber of said vacuum cylinder, manually operated devices carried by said housing constructed and arranged to permit or prevent the passage of air through said housing and into said chamber and filter means carried by said housing arranged to exclude grit and dust from air drawn through said housing into said chamber; said filter means serving also as a removable cover for access to the interior of said housing.

11. A vacuum operated vehicle brake actuating apparatus comprising a vacuum cylinder having a reciprocable piston adapted to be connected to the brake pedal of the vehicle and having a vacuum chamber adapted to be connected with and disconnected from a suction producing means, a housing mounted on said vacuum cylinder adjacent said vacuum chamber, a valve chamber in said housing in communication with said vacuum chamber, a valve element mounted for reciprocation in said valve chamber, an exhaust port in said housing adapted to be connected with a source of suction, a port in the wall of said valve chamber affording communication between said exhaust port and said valve chamber and positioned to be opened and closed by movement of said valve, a second port in the wall of said valve chamber affording communication between said valve chamber and the atmosphere and adapted to be opened and closed by movement of said valve in alternation with the opening and closing of said other port in the wall of said chamber, a rock shaft journalled in said housing, a lever of the first class fixed to said rock shaft and having one end thereof connected to said valve, a spring engaging said lever and rock shaft and tending to urge said lever to move said valve to cut off said first port and open said second port, a second rock shaft journalled in said housing, a lever of the third class freely mounted on said second rock shaft, a tension spring connecting the other end of said first named lever with the end of said second lever, an arm fixed to said second rock shaft and extending parallel to said second lever, a lug on said second lever disposed in the path of movement of said arm, a cylinder formed in said housing having an end thereof in communication with said vacuum chamber, a piston mounted for reciprocation in said cylinder and connected to said arm, a second arm fixed to said second rock shaft exteriorly of said housing, a push-pull cable assembly connecting said second arm with an operating pedal in the driver's compartment of the vehicle and spring means tending to move said interconnected arms, levers and pedal to cause said valve to close said port between the atmosphere and said valve chamber and to open said port between said exhaust port and said valve chamber.

12. A vacuum operated vehicle brake actuating apparatus comprising a vacuum cylinder having a reciprocable piston adapted to be connected to the brake pedal of the vehicle and having a vacuum chamber adapted to be connected with and disconnected from a suction producing means, a housing mounted on said vacuum cylinder adjacent said vacuum chamber, a valve chamber in said housing in communication with said vacuum chamber, a valve element mounted for reciprocation in said chamber, an exhaust port in said housing adapted to be connected with a source of suction, a port in the wall of said valve chamber affording communication between said exhaust port and said valve chamber and positioned to be opened and closed by movement of said valve, a second port in the wall of said valve chamber affording communication between said valve chamber and the atmosphere and adapted to be opened and closed by movement of said valve in alternation with the opening and closing of said other port in the wall of said chamber, a rock shaft journalled in said housing, a lever of the first order fixed to said rock shaft and having one end thereof connected to said valve, a spring engaging said lever and rock shaft and tending to urge said lever to move said valve to cut off said first port and open said second port, a second rock shaft journalled in said housing, a lever of the third order freely mounted on said second rock shaft, a tension spring connecting the other end of said first named lever with the end of said second lever, an arm fixed to said second rock shaft and extending parallel to said second lever, a lug on said second lever disposed in the path of movement of said arm, a cylinder formed in said housing having an end thereof in communication with said vacuum chamber, a piston mounted for reciprocation in said cylinder and connected to said arm, a second arm fixed to said second rock shaft exteriorly of said housing, a push-pull cable assembly connecting said second arm with an operating pedal in the driver's compartment of the vehicle and spring means tending to move said interconnected arms, levers and pedal to cause said valve to close said port between the atmosphere and said valve chamber and to open said port between said exhaust port and said valve chamber; said operating pedal and cable being constructed and arranged to serve as the control means for said brake actuating apparatus when said pedal is being moved in the vicinity of one end of its path of travel and other means engageable with said pedal constructed and arranged to serve as the throttle operating means when said pedal is being moved in the vicinity of the other end of its path of travel.

13. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, valve means yieldingly connected to a foot pedal controlled by the operator for optionally effecting said connection and other disconnection and devices separately responsive for movement in unison with vacuum in said chamber connected to said foot pedal and effective to transmit a vacuum initiated load-feel type of reaction on said pedal proportional to the braking effort exerted by said apparatus during a braking operation; said foot pedal being hinged to and overlying the throttle pedal of the vehicle.

14. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, devices for controlling the operation of said cylinder and piston comprising a housing structure mounted on said apparatus, a valve chamber in said housing having communication with said vacuum chamber, an exhaust chamber in said housing having a port adapted to be connected to a source of suction, a valve movably mounted in said valve chamber and directly responsive to vacuum therein, a port between said valve chamber and said exhaust chamber, a second port between said valve chamber and the atmosphere, and operating devices including a foot pedal in the driver's compartment of the vehicle and means operated thereby constructed and arranged to move said valve to open said first port and close said second port or to permit said valve in response to vacuum in said cylinder to open said second port and close said first port, and other vacuum responsive devices connected to said pedal for movement in unison therewith effective to transmit a vacuum initiated reaction on said pedal which is indicative of the braking effort exerted by said apparatus.

15. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, devices for controlling the operation of said cylinder and piston comprising a housing structure mounted on said apparatus, a valve chamber in said housing having communication with said vacuum chamber, an exhaust chamber in said housing having a port adapted to be connected to a source of suction, a valve movably mounted in said valve chamber and directly responsive to vacuum therein, a port between said valve chamber and said exhaust chamber, a second port between said valve chamber and the atmosphere, operating devices including a foot pedal in the driver's compartment of the vehicle and means operated thereby constructed and arranged to move said valve to open said first port and close said second port or to permit said valve in response to vacuum in said cylinder to open said second port and close said first port and other vacuum responsive devices connected to said pedal for movement in unison therewith effective to transmit a vacuum initiated reaction on said pedal which is indicative of the braking effort exerted by said apparatus; said operating devices including a tension spring between two members thereof effective to permit said valve to move yieldingly with respect to said pedal.

16. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, controlling devices for said vacuum cylinder including a supporting housing mounted on said cylinder and having communication with said vacuum chamber, an operating pedal in the driver's compartment of the vehicle, and means connecting said pedal with said devices; said connecting means comprising a push-pull cable mounted for reciprocation in a flexible sheath; said sheath being attached at one end to said housing and attached at its other end to the floor board of the vehicle; said attachment to said floor board including attaching devices which are so constructed and arranged that said attachment may be effected wholly from the interior of the driver's compartment of the vehicle.

17. A vacuum operated vehicle brake actuating apparatus comprising a vacuum cylinder having a reciprocable piston adapted to be operatively connected to the brake system of the vehicle and having a vacuum chamber adapted to be connected with and disconnected from a suction producing means, controlling devices for said vacuum cylinder including a supporting housing mounted on said cylinder and having communication with said vacuum chamber, an operating pedal in the driver's compartment of the vehicle, and means connecting said pedal with said devices; said connecting means comprising a push-pull cable mounted for reciprocation in a flexible sheath, clamp means for securing one end of said sheath to said housing and other devices for attaching the other end of said sheath to the floor board of the vehicle; said floor board having an opening therein to permit attachment of said cable to said operating pedal; said attaching devices being constructed and arranged to permit said attachment to be effected wholly from the interior of the driver's compartment of the vehicle and comprising, a pair of L-shaped brackets clamped to opposite sides of the end of said sheath, a screw securing one of said brackets to said floor board and a second screw securing the other of said brackets to said floor board.

18. A vacuum operated vehicle brake actuating apparatus comprising a vacuum cylinder having a reciprocable piston adapted to be operatively connected to the brake system of the vehicle and having a vacuum chamber adapted to be connected to a suction producing means, manually controlled valve means for connecting and disconnecting said suction producing means and said vacuum chamber, control means for said valve including a foot pedal, a train of motion transmitting elements between said pedal and said valve, and throttle operating devices mounted on said vacuum cylinder and including an element disposed in the path of movement of one of said motion transmitting elements and adapted to be actuated to effect the opening of the throttle when engaged by said motion transmitting element incident to movement imparted thereto by said pedal.

19. A vacuum operated vehicle brake actuating apparatus comprising a vacuum cylinder having a reciprocable piston adapted to be operatively connected to the brake system of the vehicle and having a vacuum chamber adapted to be connected to a suction producing means, a control unit for connecting and disconnecting said suction means and said vacuum chamber including a housing, a valve in said housing and devices constructed and arranged to operate said valve and including a rock shaft journalled in said housing, an arm fixed to said rock shaft exteriorly of said housing, a foot pedal, a link connecting said foot pedal and said arm, a spring operative to urge said arm, link and pedal to one end of its movement, and other devices mounted on said housing and disposed in the path of movement of said arm and adapted to be operatively connected to the throttle of the vehicle.

20. A vacuum operated vehicle brake actuating apparatus comprising a vacuum cylinder having a reciprocable piston adapted to be operatively connected to the brake system of the vehicle and having a vacuum chamber adapted to be connected to a suction producing means, a control unit for connecting and disconnecting said suction means and said vacuum chamber including a housing, a valve in said housing and devices constructed and arranged to operate said valve and including a rock shaft journalled in said housing, an arm fixed to said rock shaft exteriorly of said housing, a foot pedal, a link connecting said foot pedal and said arm, a spring operative to urge said arm, link and pedal to one end of its movement, and other devices mounted on said housing and disposed in the path of movement of said arm adapted to be operatively connected to the throttle of the vehicle; said other devices including an arm freely mounted on said rock shaft adjacent to said first named arm, and an adjustable abutment carried by one of said arms and adapted to engage the other of said arms with resultant movement in unison while said arms are in engagement with each other.

21. A vacuum operated vehicle brake actuating apparatus comprising a vacuum cylinder having a reciprocable piston adapted to be operatively connected to the brake system of the vehicle and having a vacuum chamber adapted to be connected to a suction producing means, a valve interposed between said suction means and said vacuum chamber, a housing enclosing and supporting said valve, valve operating devices carried by said housing and operatively connected to said pedal, and throttle operating devices carried by said housing constructed and arranged to be operated by said valve operating devices during a portion only of the movement imparted to said valve operating devices by said pedal.

22. A vacuum operated vehicle brake actuating apparatus comprising a vacuum cylinder adapted to be mounted adjacent to an actuating element of the vehicle brake system and having a piston adapted to be connected to said actuating element, a control unit separately mounted adjacent to the motor of the vehicle and having an exhaust port adapted to be connected to a suction producing means associated with the motor of the vehicle, a conduit extending between said control unit and said vacuum cylinder, devices associated with said control unit effective to connect and disconnect said suction means and said cylinder and alternatively close and open said cylinder to atmosphere including a valve directly responsive to vacuum in said cylinder, a foot pedal, and motion transmitting devices connecting said pedal with said first named devices; said motion transmitting devices including means separately and directly responsive to vacuum in said cylinder and operative to impart a load-feel type of reaction to said pedal during a braking operation.

23. A vacuum operated vehicle brake actuating apparatus comprising a vacuum cylinder having a reciprocable piston adapted to be operatively connected to an actuating element of the vehicle braking system and having a vacuum chamber adapted to be connected to a suction producing means, a manually operable valve element interposed between said chamber and the suction producing means constructed and arranged to permit said means to exhaust said chamber or to cut off communication between said means and said chamber and admit air to said chamber; said valve being further so disposed as to be subject to atmospheric pressure when a vacuum is produced in said chamber and to be urged to cut off said suction producing means, by said pressure, a second piston mounted for reciprocation in a cylinder in communication with said chamber and subject to atmospheric pressure when a vacuum is produced in said vacuum chamber and devices yieldably interconnecting said valve element and said second piston and operative when a vacuum is produced in said vacuum chamber to cause the atmospheric pressure acting on said second piston to oppose the atmospheric pressure acting on said valve element and to tend to hold said valve element against cutting off communication between said suction producing means and said vacuum chamber.

WALTER H. RIGHTER.

References Cited in the file of this patent

UNITED STATES PATENTS

| Number | Name | Date |
|---|---|---|
| 1,608,203 | Dewandre | Nov. 23, 1926 |
| 1,814,535 | Wigle | July 14, 1931 |
| 1,918,025 | Frankford | July 11, 1933 |
| 2,015,717 | Hanrotty | Oct. 1, 1935 |
| 2,087,305 | Schmitt | July 20, 1937 |
| 2,102,461 | Howell et al. | Dec. 14, 1937 |
| 2,109,101 | Clarke | Feb. 22, 1938 |
| 2,164,921 | Hoff | July 4, 1939 |
| 2,301,218 | Leupold | Nov. 10, 1942 |
| 2,320,182 | Hill | May 25, 1943 |
| 2,566,614 | Hyck | Sept. 4, 1951 |